No. 644,476. Patented Feb. 27, 1900.
R. L. SMITH.
INFLATION VALVE FOR PNEUMATIC TIRES.
(Application filed Nov. 5, 1898.)
(No Model.)
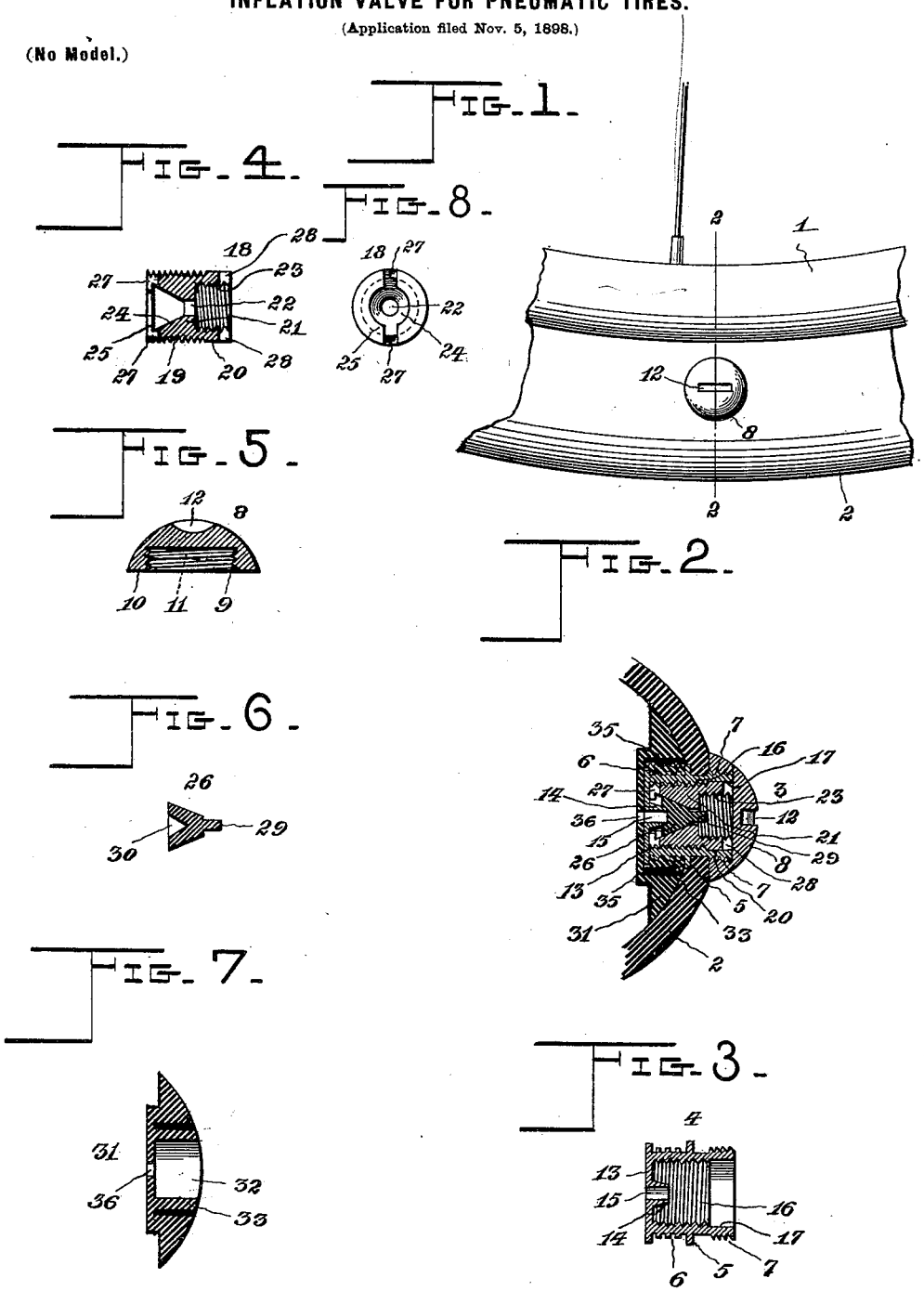
Witnesses
John F. Deuferwil
D. T. Hollhaupter
Romeyn L. Smith, Inventor
By his Attorneys,
C. A. Snow & Co.
THE NORRIS PETERS CO., PHOTO-LITHO., WASHINGTON, D. C.

United States Patent Office.

ROMEYN L. SMITH, OF NEW BRUNSWICK, NEW JERSEY, ASSIGNOR OF ONE-HALF TO WILLIAM I. DREISBACH, OF WILLIAMSPORT, PENNSYLVANIA.

INFLATION-VALVE FOR PNEUMATIC TIRES.

SPECIFICATION forming part of Letters Patent No. 644,476, dated February 27, 1900.

Application filed November 5, 1898. Serial No. 695,590. (No model.)

*To all whom it may concern:*

Be it known that I, ROMEYN L. SMITH, a citizen of the United States, residing at New Brunswick, in the county of Middlesex and State of New Jersey, have invented a new and useful Inflation-Valve for Pneumatic Tires, of which the following is a specification.

This invention relates to improvements in inflation-valves for all kinds of pneumatic tires and other inflatable bodies; and the primary object is to provide a construction of valve which may be applied to a tire without cutting or perforating the wheel-rim, thereby leaving the rim intact, preserving the strength and rigidity thereof, and overcoming numerous practical objections to prior devices, which require the insertion of the inflation-valve through the wheel-rim.

A further object of the invention is to provide an improved construction of valve in which the air-passage may be tightly closed with a view to minimizing the accidental leakage of air contained under pressure in the chamber of an inflatable tire.

With these objects in view the invention consists in the novel combination of elements and in the construction and arrangement of parts, which will be hereinafter fully described and claimed.

To enable others to understand the invention, a preferred embodiment thereof is shown in the accompanying drawings, forming a part of this specification, and in which—

Figure 1 is an elevation of part of a wheel-rim and an ordinary inflatable tire, illustrating the application of the improved inflating-valve to the side of the tire between the tread thereof and the edge of the wheel-rim. Fig. 2 is an enlarged vertical transverse section through the part shown by Fig. 1 on the plane indicated by the dotted line 2 2 of said figure. Fig. 3 is an enlarged detail sectional view through the shell or casing of the inflation-valve. Fig. 4 is a similar sectional view through the plug, which contains a conical recess forming the valve-seat. Fig. 5 is an enlarged detail sectional view of the removable cap which serves to exclude dust from the valve. Fig. 6 is a similar view of the elastic valve removed from the plug and shell. Fig. 7 is a detail sectional view of the elastic valve-attaching nipple. Fig. 8 is a plan view of the inner end of the valve-seat plug.

Like numerals of reference designate like and corresponding parts in each of the several figures of the drawings.

In order that others skilled in the art may understand the invention and its application, a portion of the wheel-rim and the inflatable tire are shown in Figs. 1 and 2 of the drawings, in which the numeral 1 designates the rim, and 2 a part of an inflatable tire; but it will be understood that no novelty for these parts is claimed in this application and that the right is reserved to use the improved inflation-valve on any kind of tire, and, in fact, in connection with any type of inflatable body requiring the use of an inflation-valve.

The inflation-valve, (designated in its entirety by the numeral 3) is preferably attached to the tire at a point between the edge of the wheel-rim and the tread of the tire or that portion thereof which is adapted to ride on the ground, yet the valve may be applied or united to the tire at any point within the tread thereof and outside of the edge of the wheel-rim. Hence the present invention is not restricted to any particular point of application of the valve to the tire so long as the foregoing conditions are observed.

Referring particularly to the detail construction of the inflation-valve 3, the numeral 4 designates the exterior tubular valve shell or casing, which is constructed of a sufficient length to extend through the wall of the tire to provide communication between the interior thereof and the usual pump connection. The said valve shell or casing is in the form of a short cylindrical tube and is provided on the exterior thereof intermediate its ends with an annular shoulder-flange 5, which coöperates with an attaching-piece that affords a fastening connection between the shell or casing and the tire-body, as will be hereinafter particularly referred to. At the inner side of the shoulder-flange 5 the tubular shell or casing 4 is provided with a series of exterior annular wire-engaging grooves 6 for the fastening-wire that is used to secure the shell or casing within the attaching-piece referred to. Beyond the outer side of the intermediate shoulder-flange 5 the shell or casing 4 is provided with an exteriorly-threaded portion 7, which is engaged by the detachable valve-cap 8. The said valve-cap 8 is of a semispherical shape and is provided at the inner side thereof with a threaded socket 9, receiving therein the outer threaded end 7 of the shell or casing 4, and around the outer edge of the threaded socket 9 the said cap 8 is formed with a flat contact shoulder or face 10, adapted to be turned flat against the exterior surface of the tire directly around the outer end of the valve shell or casing, so as to afford a perfectly air-tight joint at the outer end of the valve shell or casing when the detachable cap 8 is in position. This construction dispenses with the necessity of an extra gasket or the like for the valve-cap connection; but should it be desired to guard against any possible leakage through the cap an extra elastic washer 11 may be fitted in the base of the socket 9, so that when the valve-cap is screwed down over the outer threaded end of the valve shell or casing the said washer will bear upon the extreme outer edge of the shell or casing 4. The extra interior elastic washer 11 is not ordinarily resorted to and is therefore only indicated in the drawings by dotted lines, as the flat contact shoulder or face 10, by reason of its direct contact with the rubber body of the tire, makes a perfectly airtight joint at the outer end of the shell or casing and not only prevents leakage of air from the tire, but positively excludes dust and dirt from the valve, thereby overcoming accumulations of dust in the valve and the consequent interference with the adjustment of the plug or the operation of the elastic valve-body, to be referred to. The semispherical shape of the valve-cap 8 presents a rounded convexed surface at the outer side of the tire, and to facilitate the removal and replacing of said cap the same is provided in said outer rounded side with a circular notch or groove 12, which may be engaged by a screw-driver or an equivalent instrument.

The tubular valve shell or casing 4 is open at its outer end and is closed at its inner end by a head 13, having projected integrally at its inner side and from the center thereof an inwardly-disposed tubular or hollow valve-compressing stud 14. The tubular or hollow valve-compressing stud projects inwardly within the shell or casing 4 from the inner closed end thereof, and the hole or passage 15 through the said stud pierces the head 13 of the shell or casing and constitutes the sole air passage or port at said inner end of the valve shell or casing. The function of the tubular or hollow stud 14 and the single air passage or bore 15 therethrough will be hereinafter more particularly referred to; but in addition to the head 13 and the interior valve-compressing stud 14 the tubular valve shell or casing 4 has the interior bore thereof provided for the greater portion of its length with left-hand threads 16, and beyond the outermost of said threads, directly adjacent to the extreme outer edge of the shell or casing 4, the latter is provided with an interior smooth counterbored portion 17, which affords means for the proper flush fit of the adjustable valve-seat plug 18, which is designed to work within the shell or casing 4.

The adjustable valve-seat plug 18 is also made in a single piece in the form of a cylindrical tube, and said plug is provided on the exterior surface thereof for a greater portion of its length with the exterior left-hand threads 19, adapted to engage with the corresponding threads 16 within the bore of the valve shell or casing 4. Adjacent to its outer end said plug 18 is provided with a smooth exterior annulus 20, adapted to register in the smooth counterbore 17 at the outer end portion of the valve shell or casing 4. The said adjustable valve-seat plug 18 is provided intermediate its ends with an interior diaphragm 21, pierced centrally by a single air-port 22, and at the outer side of this diaphragm the plug 18 is formed with a threaded socket 23 to receive the ordinary nipple by which a flexible tube from an inflating-pump may be readily coupled when it is desired to force air through the valve into the tire or other inflatable body. At the inner side of the diaphragm 21 the adjustable plug 18 is formed with a longitudinally-disposed conical valve-seat recess 24, communicating at its apex with the air-port 22 and surrounded at its inner peripheral edge by an inturned annular retaining-flange 25. The inturned annular retaining-flange 25 is formed at the extreme inner end of the valve-seat plug 18 and overhangs the flared or wide end of the conical valve-seat recess 24 to provide for properly retaining in a working position the conical compressible or elastic valve-body 26, which normally registers loosely within the valve-seat 24 and has the wide base end thereof embraced by the inturned annular retaining-flange 25 of the valve-plug. The said valve-seat plug has the inner annular retaining-flange 25 thereof pierced at diametrically-opposite points with the air slots or passages 27, which permit the escape of air from the valve-seat recess 24 when the compressible or elastic valve-body is moved off of the seat and against the retaining-flange 25, and at the end opposite the said flange the said valve-seat plug is provided at opposite points with the screw-driver notches 28 for receiving the screw-driver or similar device for turning the plug within the shell or casing 4, receiving the same.

The valve 26 is preferably formed of a single piece of rubber or equivalent elastic material, which will permit the same to be compressed tightly within the conical valve-seat recess 24, and said conical valve-body 26 is provided at the apex thereof with a stem extension 29, which loosely projects through the air-port 22 in the diaphragm 21, and in the wide base end thereof the said conical compressible valve-body 26 is provided with a reentrant conical recess 30, which receives the bored end of the inwardly-projecting valve-compressing stud 14, so as to form a complete covering for one end of the stud and effectually shut off the escape of air therethrough when the adjustable plug is turned down within the valve shell or casing, so as to carry the compressible valve-body 26 firmly against said stud. When this operation takes place, it will be observed that the recessed end of the valve-body not only serves to cover the end of the tubular stud contacting therewith, but the latter also serves to tightly compress or expand the valve-body within the conical valve-stud recess 24, so as to make a perfectly air-tight joint between the said valve-body and the adjustable plug 18.

In the use of the valve, when it is desired to force air therethrough the valve-cap 8 is first removed and the valve-seat plug 18 is turned up sufficiently to release the valve-body 26 from pressure against the valve-compressing stud 14, so that when the pump-nipple is fitted in the threaded socket 23 and the pump started the air-pressure will displace the valve-body 26 from contact with the walls of the valve-seat recess 24 and will force said valve-body against the annular retaining-flange 25, which flange prevents the valve from being carried against the valve-compressing stud, and thereby closing the passage therethrough. With the valve thus positioned the air readily passes through the adjustable valve-seat plug, the air slots or passages 27 communicating with the valve-seat recess 24, and through the passage of the tubular stud 14 into the tire or other inflatable body. After the tire or other inflatable body has been sufficiently inflated the adjustable valve-seat plug 18 is screwed into the shell or casing 4, so as to carry the valve-body 26 against the stud 14, and this stud, together with the internal pressure of air from the inflated body, will serve to tightly hold the valve against its seat and obviate leakage of air.

In using the inflation-valve herein described novel means are employed for attaching the valve shell or casing to the inflatable tire, and this valve-attaching means is peculiarly constructed for the metallic parts of the valve to remain undisturbed and in their normal condition under the depression or action of the inflatable tire. The valve-attaching means is preferably embodied in the form of a disk 31, which is tapered in cross-section so as to produce a flat surface on one side and a curved face on the opposite side. The said attaching-disk is made of rubber or fabric, or both, and the central portion thereof, by reason of the shape described, is necessarily made considerably thicker than the edges of the disk, and in this central portion is produced a central recess 32, from which is projected an elastic nipple 33. To firmly unite the metallic valve shell or casing 4 to said elastic nipple 33 of the attaching-disk, a fastening or binding wire 35 is employed. This fastening or binding wire is coiled or twisted exteriorly around the nipple 33 to force the latter firmly into the annular grooves 6, formed on the exterior of the shell or casing 4 at the inner side of the shoulder-flange 5. The elastic nipple 33, which is thus fastened to the inner curved end of the valve shell or casing 34, lies within the plane of the central recess 32, and these parts are subsequently vulcanized to provide for permanently and hermetically uniting the attaching-disk to the shell or casing. The said attaching-disk is provided therein with a single port 36, which is coincident with the single hole or passage 15 through the valve-compressing seat 14, thereby providing direct communication between the interior of the tire or other inflatable body and the inflation-valve.

From the foregoing it will be understood that the inflating-valve may be readily united to any tire in which the valve is permanently housed or retained and in which said valve is arranged to be out of the way of the tire-tread or wheel-rim, and by reason of the particular manner of mounting the valve it will be observed that the formation of an aperture or hole in the wheel-rim is entirely obviated, while at the same time the valve is arranged to lie partly flush with the exposed face of the tire, so that the dust-excluding cap is the only part of the valve that is visible on the tire.

In carrying out the invention various modifications will necessarily suggest themselves to those skilled in the art; so it will be understood that any changes in the form, proportion, and the minor details of construction may be resorted to without departing from the principle or sacrificing any of the advantages of this invention.

Having thus described the invention, what is claimed as new, and desired to be secured by Letters Patent, is—

1. An inflating-valve comprising a casing having a compression-stud, a valve-seat plug with a conical seat-recess, and a compressible valve slidably confined in said seat-recess and having in one end a recess adapted to receive the compression-stud, said valve being compressible by direct contact with the seat-plug and the stud, substantially as described.

2. An inflating-valve comprising a casing having a central compression-stud, a valve-seat plug with a conical seat-recess and a central air-port, and a compressible conical valve provided at one end with a stem and at its other end with a recess, said valve being slidably confined in the valve-seat plug for the stem to play in the port and adapted to be compressed by said seat-plug and the stud, substantially as described.

3. An inflation-valve comprising a valve shell or casing having an air-port at its inner end, an adjustable valve-seat plug arranged within the shell or casing, and a compressible valve adapted to be forced or expanded within the seat of said plug by contacting with the shell or casing, substantially as set forth.

4. An inflation-valve, comprising a shell or casing having an air-port at its inner end, a valve-seat plug longitudinally adjustable within said shell or casing, and having a valve-seat recess, and a compressible valve loosely housed within said recess and movable with the plug, said plug being adjustable to the position for compressing the valve within the recess thereof, substantially as set forth.

5. An inflating-valve comprising a casing having a compression-stud, a valve-seat plug with a conical seat-recess and a flange at the base of said seat-recess, and a conical compressible valve confined slidably in the seat-recess by the flange of the valve-seat plug, substantially as described.

6. An inflation-valve, comprising a tubular valve shell or casing provided at its inner end with an air-port and a valve-compressing stud, an adjustable valve-seat plug mounted within said shell or casing and provided in its inner end portion with a valve-seat and an inturned retaining-flange surrounding the peripheral edge of said seat, and a compressible valve-body arranged within said valve-seat, substantially as set forth.

7. An inflation-valve, comprising a tubular valve shell or casing interiorly threaded and provided at its inner closed end with an inwardly-projecting hollow valve-compressing stud, and an exteriorly-threaded valve-seat plug mounted within the shell or casing and provided within its inner end portion with a conical valve-seat recess and at its inner edge with an annular retaining-flange overhanging said recess, and a conical compressible valve-body housed within the valve-seat recess and provided in the wide base end thereof with a reëntrant recess adapted to take over the said valve-compressing stud, substantially as set forth.

8. In an inflation-valve, the combination of a flexible attaching-disk provided with a central recess and an elastic nipple protruding from said recess, the valve shell or casing having an annularly-grooved portion fitting within said nipple, and a fastening encircling the nipple and annularly-grooved portion of the valve shell or casing, substantially as set forth.

In testimony that I claim the foregoing as my own I have hereto affixed my signature in the presence of two witnesses.

ROMEYN L. SMITH.

Witnesses:
LOYD T. SIMS,
S. E. BURWELL.